June 12, 1923.

C. W. PIERCE 1,458,846

LEATHER FINISHING MACHINE

Filed Nov. 16, 1920

C.W. Pierce INVENTOR

BY Victor J. Evans ATTORNEY

Patented June 12, 1923.

1,458,846

UNITED STATES PATENT OFFICE.

CHARLES WARREN PIERCE, OF SOUTH DUXBURY, MASSACHUSETTS, ASSIGNOR OF ONE-HALF TO CHARLES DRISCOLL, OF BROCKTON, MASSACHUSETTS.

LEATHER-FINISHING MACHINE.

Application filed November 16, 1920. Serial No. 424,397.

*To all whom it may concern:*

Be it known that I, CHARLES WARREN PIERCE, a citizen of the United States, residing at South Duxbury, in the county of Plymouth and State of Massachusetts, have invented new and useful Improvements in Leather-Finishing Machines, of which the following is a specification.

This invention relates to a leather finishing machine, and the object is to provide for effecting mechanically the operation known as boarding, by means of which a particular finish is given to the leather.

A further object is to provide a machine which shall include a traveling element carrying a series of transverse slats, each provided with a surface layer of cork, rubber, or other suitable material, and to provide in connection therewith a clamping element having a flat surface which may be brought into intimate contact with the hide to be operated upon, after the hide has been placed on the traveling element and folded with the hair or finished side turned in. Power is applied to the element last named and the leather moves between the cork surfaces, while the upper movable element is under pressure, with the result that the desired surface is given to the leather as in the case of hand boarding, by rolling the folded portion, so that very shallow grooves develop on the inner or finished side.

A further object is to provide a machine of the type indicated, which shall include a frame serving to mount a plurality of shafts, one of which is driven by outside power, these shafts carrying an endless belt provided with transverse slats, usually formed of wood, and each provided with a surface layer of cork, rubber, or other similar material, which will impart the desired movement to the leather; and to provide in connection therewith suitable clamping elements.

A still further object is to provide a clamping or pressure element having a flat surface, and being provided on the underside with a layer of cork or other suitable material, with a lever or other suitable device by means of which pressure may be applied to the sheet of leather passing between this pressure element and the traveling element before mentioned.

With the foregoing and other objects in view, the invention consists in the novel construction, combination, and arrangement of elements hereinafter described and claimed.

Figure 1:
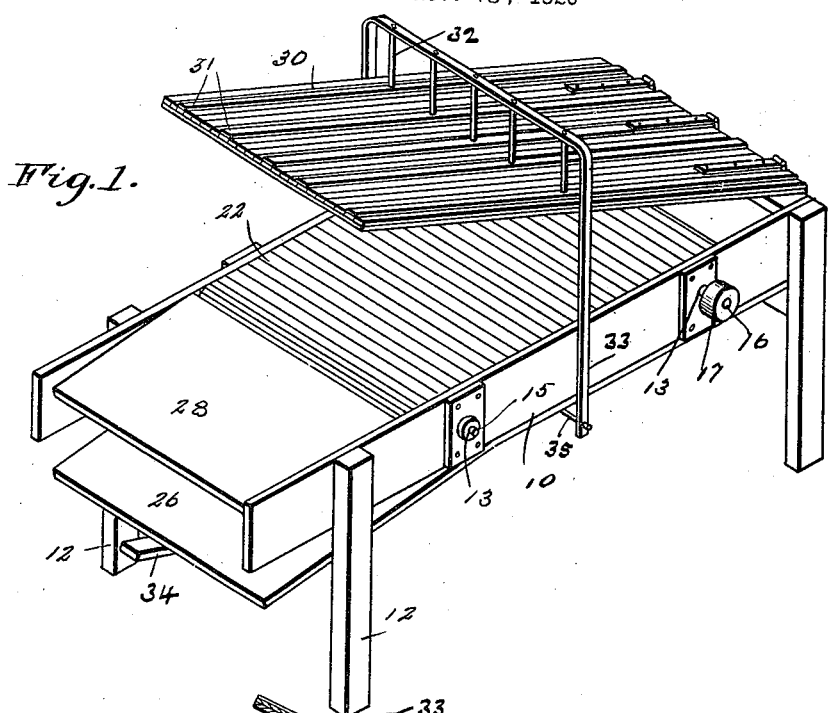
Figure 2:
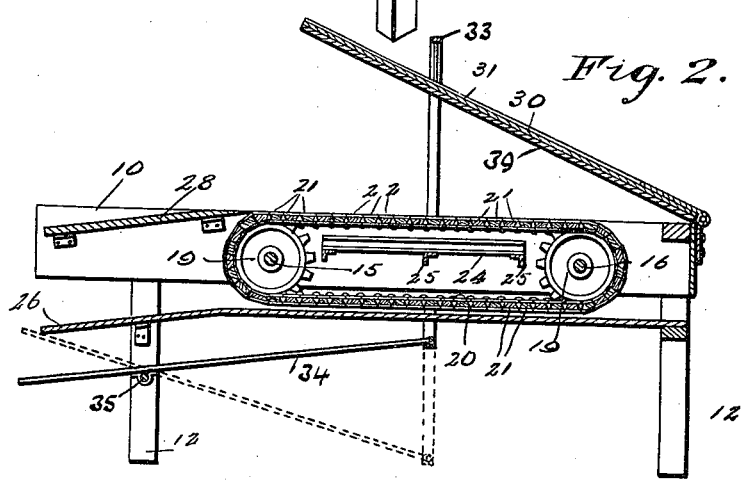
Figure 3:
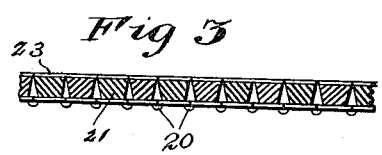

In the drawings, Figure 1 is a perspective view of the machine, Figure 2 is a view in vertical section, and Figure 3 is a fragmentary view, in section, of the travelling element.

In carrying out my invention, I provide a frame 10 having suitable legs or other support 12, and being provided with bearings 13 oppositely located, certain of these bearings serving to mount a shaft 15, and the other bearing mounting a shaft 16 carrying a pulley 17, driven from any suitable source of power.

Mounted on the aforesaid shafts are sprocket wheels 19, which in turn serve to mount a chain belt 20. This belt 20 is provided with transverse slots 21, preferably formed of wood, such as oak, and covered with cork 22 or other suitable material. In Figure 3, I have shown a modified form of these slats in which the covering 23 of rubber is employed.

Longitudinal guides 24 are provided for the transverse members, and transverse bars 25 are located as shown. A guide or apron 26 facilitates the discharge of the hide or sheet of leather from the machine, and a table 28 is located as shown, the hide passing over this table when entering the machine.

The upper clamping element, or cover, per se, is designated 30 and is provided with steel reinforcing or stiffening devices 31. Element 30 is hinged to the frame 10, and is connected by rods or hangers 32 with a U frame 33, the latter being actuated or raised by the lever 34 connected with a transverse rod 35, whereby the cover or upper clamping element is raised and lowered. The underside of the cover is provided with a surface of cork designated 39, other suitable material being used if desired.

In the use of the device the hide is folded over with the hair side turned inwardly. This provides a double thickness with the two surfaces exposed which are engaged respectively by the belt and pressure element. Power being applied to the driving shaft and pressure being applied to the cover, the leather moves along in contact with the cork surfaces, and the same surface is imparted to the hair side as is imparted by the hand operation known as boarding due to the rolling of the crease or fold.

What I claim is:

1. In a machine for finishing leather, a frame, an endless belt mounted for movement therein, a plurality of transverse elements fixed to the belt, a surface element of yielding material for each of said transverse elements, and a pressure device for engaging that side of a sheet of leather opposite to that engaged by said surface elements, said pressure means including a hingedly mounted element, a U-shaped frame passing around the hinged element and the frame first named, devices connecting various portions of the U frame and the hinged element, and means for depressing the U frame.

2. In a machine for finishing leather, a frame, a plurality of shafts mounted therein, an endless belt driven by said shafts, transverse elements carried by the belt, surface elements of cork applied to the transverse elements, and means for applying various degrees of pressure to a sheet of leather passing over the transverse elements and the surface elements carried thereby said pressure means including a hingedly mounted element, a U-shaped frame passing around the hinged element and the frame first named, devices connecting various portions of the U frame and the hinged element, and means for depressing the U frame.

3. A machine for finishing leather, including a traveling device provided with yielding surface elements, and means for applying pressure to a sheet of leather passing over the traveling device said pressure means including a hingedly mounted element, a U-shaped frame passing around the hinged element and the frame first named, devices connecting various portions of the U frame and the hinged element, and means for depressing the U frame.

In testimony whereof I affix my signature.

CHARLES WARREN PIERCE.